US011777939B2

(12) United States Patent
Li et al.

(10) Patent No.: US 11,777,939 B2
(45) Date of Patent: Oct. 3, 2023

(54) METHOD AND DEVICE FOR PROCESSING INFORMATION, AND STORAGE MEDIUM

(71) Applicant: BEIJING XIAOMI PINECONE ELECTRONICS CO., LTD., Beijing (CN)

(72) Inventors: Zhiming Li, Beijing (CN); Li Zhao, Beijing (CN); Yanning Wang, Beijing (CN); Feng Han, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 296 days.

(21) Appl. No.: 16/939,375

(22) Filed: Jul. 27, 2020

(65) Prior Publication Data

US 2021/0211432 A1 Jul. 8, 2021

(30) Foreign Application Priority Data

Jan. 8, 2020 (CN) .......................... 202010018965.9

(51) Int. Cl.
*H04L 9/40* (2022.01)
*H04L 67/12* (2022.01)
(52) U.S. Cl.
CPC ........ *H04L 63/102* (2013.01); *H04L 63/0281* (2013.01); *H04L 63/083* (2013.01); *H04L 67/12* (2013.01)
(58) Field of Classification Search
CPC . H04L 63/102; H04L 63/0281; H04L 63/083; H04L 67/12
See application file for complete search history.

(56) References Cited

U.S. PATENT DOCUMENTS

| 9,104,537 | B1 | 8/2015 | Penilla et al. |
| 9,830,637 | B2* | 11/2017 | Betancourt ............ G06Q 10/06 |
| 2016/0261425 | A1* | 9/2016 | Horton ................ H04L 67/1097 |
| 2016/0344747 | A1 | 11/2016 | Link, II |
| 2017/0011572 | A1 | 1/2017 | Link, II |
| 2017/0230307 | A1* | 8/2017 | Li ............................. H04L 9/40 |
| 2017/0327084 | A1* | 11/2017 | Park ..................... B60R 16/037 |
| 2018/0108194 | A1 | 4/2018 | Link, II |

(Continued)

FOREIGN PATENT DOCUMENTS

| CN | 104348777 A | 2/2015 |
| CN | 106412833 A | 2/2017 |

(Continued)

OTHER PUBLICATIONS

Extended European Search Report in the European Application No. 20188324.6, dated Dec. 18, 2020, (9p).

(Continued)

*Primary Examiner* — Harris C Wang
(74) *Attorney, Agent, or Firm* — Arch & Lake LLP

(57) ABSTRACT

A method and device for processing information, and a storage medium is provided. The method is applied to an authorization proxy server, and includes receiving a first account information of a first vehicle-mounted terminal, determining, based on an associating record of a user account service, that a first account corresponding to the first account information is an authorized account that has been associated with the user account service, and authorizing the first account with a control right for controlling a device to be controlled.

12 Claims, 9 Drawing Sheets

(56) References Cited

U.S. PATENT DOCUMENTS

| | | | | |
|---|---|---|---|---|
| 2019/0138184 A1* | 5/2019 | Kim | ................... | G06F 3/0416 |
| 2019/0228144 A1* | 7/2019 | Kermes | ............... | H04L 63/0861 |
| 2019/0259229 A1 | 8/2019 | Link, II | | |
| 2020/0193749 A1 | 6/2020 | Link, II | | |
| 2020/0213399 A1* | 7/2020 | Fuhrmann | ............. | H04L 67/125 |
| 2020/0245144 A1* | 7/2020 | Sandu | ................... | H04W 12/06 |
| 2021/0110934 A1* | 4/2021 | Shin | ....................... | H04W 4/44 |
| 2022/0236702 A1* | 7/2022 | Nakayama | ............. | G05B 15/02 |

FOREIGN PATENT DOCUMENTS

| | | |
|---|---|---|
| CN | 108737424 A | 11/2018 |
| CN | 110022294 A | 7/2019 |
| WO | 2016191075 A1 | 12/2016 |

OTHER PUBLICATIONS

First Office Action of the Chinese Application No. 202010018965.9, dated Oct. 13, 2021 with English translation, (11p).

\* cited by examiner

METHOD AND DEVICE FOR PROCESSING INFORMATION, AND STORAGE MEDIUM

CROSS-REFERENCE TO RELATED APPLICATION

The present application is based on and claims priority to Chinese patent application No. 202010018965.9 filed on Jan. 8, 2020, the entirety of which is incorporated herein by reference.

TECHNICAL FIELD

The disclosure relates to the field of information processing, and particularly to a method and device for processing information, and a storage medium.

BACKGROUND

With development of Internet of things (IoT), bigdata and artificial intelligence, Internet of everything and smart life have become focus of researches and development. Recently, IoT has attracted public attention as a new trend in the field of intelligent transportation, and vehicle-home interconnection is about to improve.

Vehicle-home interconnection means that a vehicle-mounted terminal is connected to a household device, so as to realize the function of viewing and controlling the household device via a control module of the vehicle-mounted terminal.

SUMMARY

According to a first aspect of the present disclosure, an authorization proxy server is provided. The authorization proxy server may include one or more processors, a non-transitory computer-readable memory storing instructions executable by the one or more processors. The one or more processors may be configured to receive first account information of a first vehicle-mounted terminal. The one or more processors may also be configured to determine, based on an associating record of a user account service, that a first account corresponding to the first account information is an authorized account that has been associated with the user account service. The one or more processors may also be configured to authorize the first account with a control right for controlling a device to be controlled.

According to a second aspect of the present disclosure, a user account server is provided. The user account server may include one or more processors, a non-transitory computer-readable memory storing instructions executable by the one or more processors. The one or more processors may be configured to receive a login request from a mobile device. The login request may carry a first account information of a first vehicle-mounted terminal. The one or more processors may be configured to issue, in response to verification of a first account corresponding to the first account information being passed, verification information to the mobile device. The one or more processors may be configured to receive, from an authorization proxy server requiring the user account service, an authorization request carrying the verification information. The authorization request is may be sent by the authorization proxy server after receiving, from the mobile device, an access request carrying the verification information. The one or more processors may be configured to perform verification with the verification information. The one or more processors may be configured to send, in response to succeeding in the verification with the verification information, an authorization password to the authorization proxy server The authorization password may be used for the authorization proxy server to generate an associating record of the first account having acquired a control right for controlling a device to be controlled.

According to a third aspect of the present disclosure, a first vehicle-mounted terminal is provided. The first vehicle-mounted terminal may include one or more processors, a non-transitory computer-readable memory storing instructions executable by the one or more processors. The one or more processors may be configured to acquire, in response to not acquiring predetermined information of a device to be controlled, a login link for logging into a user account server providing a user account service. The one or more processors may be configured to display the login link. The login link may be used for the first vehicle-mounted terminal to obtain, based on a first account, a control right for controlling the device to be controlled. The one or more processors may be configured to display, based on the control right obtained by the first account, the predetermined information of the device to be controlled.

According to a fourth aspect of the present disclosure, a non-transitory computer-readable storage medium having stored therein instructions is provided. When the instructions are executed by one or more processors of the apparatus, the instructions may cause the apparatus to receive first account information of a first vehicle-mounted terminal. The instructions may also cause the apparatus to perform determine, based on an associating record of a user account service, that a first account corresponding to the first account information is an authorized account that has been associated with the user account service. The instructions may also cause the apparatus to perform authorize the first account with a control right for controlling a device to be controlled.

According to a fifth aspect of the present disclosure, a non-transitory computer-readable storage medium having stored therein instructions is provided. When the instructions are executed by one or more processors of the apparatus, the instructions may cause the apparatus to receive a login request from a mobile device. The login request may carry a first account information of a first vehicle-mounted terminal. The instructions may also cause the apparatus to perform issue, in response to verification of a first account corresponding to the first account information being passed, verification information to the mobile device. The instructions may also cause the apparatus to perform receive, from an authorization proxy server requiring the user account service, an authorization request carrying the verification information. The authorization request may be sent by the authorization proxy server after receiving, from the mobile device, an access request carrying the verification information. The instructions may also cause the apparatus to perform verification with the verification information. The instructions may also cause the apparatus to perform send, in response to succeeding in the verification with the verification information, an authorization password to the authorization proxy server. The authorization password may be used for the authorization proxy server to generate an associating record of the first account having acquired a control right for controlling a device to be controlled.

According to a sixth aspect of the present disclosure, a non-transitory computer-readable storage medium having stored therein instructions is provided. When the instructions are executed by one or more processors of the apparatus, the instructions may cause the apparatus to acquire, in response to predetermined information of a device to be controlled is not available, a login link for logging into a user account server providing a user account service. The instructions may also cause the apparatus to perform display the login link. The login link is used for the first vehicle-mounted terminal to obtain, based on a first account, a control right for controlling a device to be controlled. The instructions may also cause the apparatus to perform display, based on the control right obtained by the first account, the predetermined information of the device to be controlled.

The embodiments of the present disclosure may have the following beneficial effects.

BRIEF DESCRIPTION OF THE DRAWINGS

The accompanying drawings herein are incorporated into the specification and constitute part of the present specification, illustrate embodiments consistent with the disclosure and are intended for explaining the principles of the disclosure together with the specification.

DETAILED DESCRIPTION

Detailed description will be made here to embodiments, examples of which are illustrated in the accompanying drawings. When drawings are referred to in the following description, identical numerals in different drawings refer to identical or similar elements, unless otherwise indicated. Implementations described in the following embodiments do not mean all the implementations consistent with the disclosure. On the contrary, they are merely examples of apparatuses and methods consistent with some aspects of the disclosure detailed in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
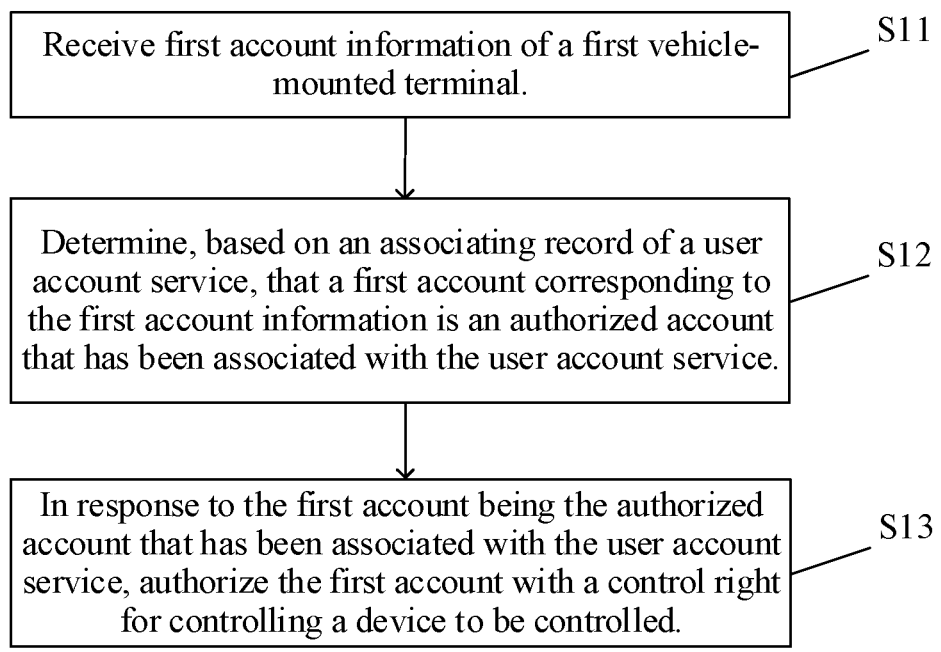
FIG. 1 illustrates a first flow chart of a method for processing information, according to an example of the present disclosure.

FIG. 1 illustrates a first flow chart of a method for processing information according to embodiments of the disclosure. The method for processing information is applied to an authorization proxy server, and as illustrated in FIG. 1, includes the following steps.

In step S11, a first account information of a first vehicle-mounted terminal is received. The first account information, for example, is a login account and may include login information for the account.

In step S12, whether the first account corresponding to the first account information is an authorized account that has been associated with a user account service is determined based on an associating record of the user account service. The associating record, for example, holds a record of authorized accounts. The user account service, for example, is hosted and accessed on a server.

In step S13, in response to the first account being the authorized account that has been associated with the user account service, the first account is authorized with a control right for controlling a device to be controlled.

In some embodiments, the first vehicle-mounted terminal is a control terminal mounted on a vehicle. The control terminal may receive an operation instruction from a user so as to control a navigation application and a radio application integrated in the control terminal, and an associated device to be controlled.

The device to be controlled includes but is not limited to a smart home device and/or a smart office device. The smart home device includes: a smart cleaning device, a smart window and door, and/or an environmental conditioning device. The smart cleaning device includes but is not limited to a floor mopping robot. The environmental conditioning device includes, an air conditioner, an air purifier, etc. The smart office device may include a smart printer, a smart fax machine, etc.

An example is given with the device to be controlled being a smart home device, in embodiments of the disclosure. The vehicle-mounted terminal may control an associated device to be controlled, by an application (APP) installed on the vehicle-mounted terminal, for example, a vehicle-home interconnection APP. When started, the vehicle-home interconnection APP may display, based on a first account input by a user, predetermined information of a device to be controlled, so as to control the device to be controlled, when it is determined that the first account is an authorized account having obtained a control right for controlling the device to be controlled. In some embodiments, the first account of the first vehicle-mounted terminal refers to a login account of an APP installed in the first vehicle-mounted terminal, for example, a login account of the vehicle-home interconnection APP.

It is to be noted that, in embodiments of the disclosure, a server supporting running of the vehicle-home interconnection APP is a Telematics Service Provider (TSP) server. The TSP server is connected with a vehicle, a vehicle-mounted device manufacture and a network operator on one hand, and is connected with a content provider (for example, navigation and entertainment provider) on the other hand. The TSP server is also referred to as a vehicle-mounted central control server. The TSP server being connected with the vehicle-mounted device manufacture on one hand, refers to that the TSP server is connected with a vehicle manufacture account server, so as to verify a vehicle and a vehicle owner identity through the vehicle manufacture account server. The vehicle manufacture account server is a merchant server belonging to, for example, a Benz manufacture or a Bayerische Motoren Werke (BMW) manufacture. After obtaining verification pass information from the vehicle manufacture account server, the TSP allows the vehicle-home interconnection APP to access the device to be controlled.

At this time, the control terminal mounted in the vehicle of the owner is configured with attributes of the vehicle. That is to say, the first vehicle-mounted terminal is configured with vehicle identification information and information of the vehicle owner identity. The vehicle identification information may be a vehicle identification number (VIN), and the information of the vehicle owner identity may be such as an identification number of the owner. There is a correspondence between the first account and the vehicle attributes of the first vehicle-mounted terminal.

The vehicle-home interconnection APP, after being started, can send, through the TSP server, the vehicle identification information and the information of the vehicle owner identity to the vehicle manufacture account server, so that the vehicle manufacture account server determines whether the vehicle is a registered vehicle. Only if the vehicle manufacture account server determines that the vehicle is a registered vehicle, the TSP server will apply, for the first account of the vehicle-home interconnection APP, a control right for controlling the device to be controlled.

It is to be noted that, the control right for controlling the device to be controlled that the TSP server applies for the first account is sent to a smart device server managing the device to be controlled. On one hand, the TSP server can acquire, based on the control right, predetermined information of the device to be controlled from the smart device server, and send the predetermined information to the vehicle-home interconnection APP, so that the vehicle-home interconnection APP displays the predetermined information. The predetermined information includes a device identification and state information of the device. The device identification includes identification information that can identify the corresponding device to be controlled, such as a device name and/or a device type. The state information of the device includes running state information and/or state of charge information, such as an indication of whether the device is turned on or off, an operation parameter of the device in operation, and charge information. On the other hand, after receiving an operation instruction from the vehicle-home interconnection APP, the TSP server can enable, based on the control right and through the smart device server, the device to be controlled to execute the operation instruction.

It is to be noted that, in the disclosure, the authorization proxy server is introduced due to that different vehicle manufacture services may be independent from one another, for example, external interfaces of different vehicle manufacture services may be different. The function of the authorization proxy server is to connect with different vehicle manufacture account servers on one hand, and to provide a unified interface service for TSP servers on the other hand. In this way, the vehicle-home interconnection APP can be oriented at different vehicle manufactures.

Of course, services of devices to be controlled from different manufactures may also be independent from one another, and the authorization proxy server can further enable the vehicle-home interconnection APP to be oriented at different services of devices to be controlled.

In step S11 of the disclosure, the authorization proxy server may receive the first account of the first vehicle-mounted terminal from the TSP server. For example, after receiving the first account input by the user, the vehicle-home interconnection APP will report the first account to the TSP server. The TSP server forwards the first account to the authorization proxy server, so that the authorization proxy server determines whether the first account is an authorized account that has been associated with the user account service.

It is to be noted that, in embodiments of the disclosure, servers providing the user account service include an authorization proxy server. The associating record may be stored in the authorization proxy server, so that the authorization proxy server can determine, based on the associating record stored in the authorization proxy server, whether the first account is an authorized account. The associating record may also be stored in a vehicle manufacture account server. The servers providing the user account service may also include a vehicle manufacture account server. The authorization proxy server can also determine, based on the associating record stored in the vehicle manufacture account server, whether the first account is an authorized account.

In the associating record, it may be labelled whether an account is authorized, for example, whether the first account is an authorized account. Alternatively, authorization information corresponding to the first account may also be labelled in the associating record. The authorization information may be an authorization password, such as a token. The authorization information may be stored in the authorization proxy server or the vehicle manufacture account server.

In step S12, the authorization proxy server determines, based on an associating record of a user account service, whether the first account is an authorized account.

In step S13, the authorization proxy server may authorize the first account with a control right for controlling a device to be controlled, after determining that the first account is an authorized account. As such, the user can control, through the first vehicle-mounted terminal, the device to be controlled.

It is to be noted that, one way for the authorization proxy server to authorize the first account with the control right for controlling the device to be controlled is: the authorization proxy server provides the first account with authorization information corresponding to the first account stored in the authorization proxy server. Another way is that the authorization proxy server acquires, based on the first account, authorization information from the vehicle manufacture account server. When the associating record is stored in the vehicle manufacture account server, the authorization information may be stored in the vehicle manufacture account server in an embodiment.

In some embodiments, an authorization proxy server determines whether a first account of a first vehicle-mounted terminal is an authorized account. The first account is authorized with a control right for controlling a device to be controlled, if it is determined that the first account is an authorized account. On the one hand, the security in controlling a device to be controlled is improved. On the other hand, it is the authorization proxy server, rather than a device-end server directly managing the device or a server serving for a first vehicle-mounted terminal that determines whether a first account is an authorized account; thus, a device-end service oriented at different vehicle-mounted terminal manufactures and different devices to be controlled can be provided through the authorization proxy server, improving the universality of the vehicle-mounted terminal in controlling different devices to be controlled.

It is to be noted that, the associating record is generated in advance in some embodiments. Based on the generated associating record, the authorization proxy server only needs to determine, based on the associating record, that an account is an authorized account, and acquire corresponding authorization information based on the authorized account. Moreover, the operation of authorizing the first account is performed by a user account service. Servers providing the user account service also include a user account server, and the authorization proxy server generates the associating record through the user account server in advance. In some embodiments, the operation that the authorization proxy server generates the associating record in advance includes:

receiving an access request from a mobile device having been authorized to access the authorization proxy server;

determining whether the access request carries verification information issued previously by the user account server; and in response to determining that the access request carries the verification information, generating the associating record for the first account carried in the access request.

In some embodiments, the mobile device may be a mobile phone, a tablet, etc. An authorized mobile device refers to a mobile device having been authorized to access the authorization proxy server. The mobile device is authorized by the user account server to access the authorization proxy server. For example, the user account server provides identification information of the authorization proxy server to the mobile device, and then the mobile device is authorized to access the authorization proxy server.

For example, the user account server sends address information of the authorization proxy server to the mobile device, so that the mobile device can send an access request to the authorization proxy server based on the address information.

In some embodiments, an example is given with the associating record being stored in the authorization proxy server. The authorization proxy server generates the associating record for the first account carried in the access request, only after determining that the access request carries verification information. In some embodiments, the verification information may be information previously agreed by the user account server and the authorization proxy server, for example, a character string in a specific format; or identification information for identifying the authorization proxy server.

In one or more embodiments, the verification information contains an access address of the authorization proxy server.

Here, the verification information is previously issued by the user account server to the mobile device. Carrying the access address of the authorization proxy server in the access request as verification information enables the mobile device to quickly access the authorization proxy server. By means of information multiplexing, on one hand, the mobile device is informed of the access address, so that the mobile device can access the authorization proxy server through the access address; on the other hand, the access address is used as verification information, so that it can be determined whether the mobile device has acquired the access address legally by verifying the access address, when the authorization proxy server has multiple access addresses. Furthermore, with the access address used as verification information, there is no need to issue verification information specially, simplifying the step of authorization.

Here, after determining that the access request contains the verification information, the authorization proxy server responds to the first account's authorization request of authorizing a control right for controlling the device to be controlled, generates an associating record for the first account.

It is to be noted that, in embodiments of the disclosure, when the access request received by the authorization proxy server does not carry verification information previously issued by the server, it indicates that the first account carried in the access request may be an authorized account. At this time, the access request not carrying verification information is a request for acquiring authorization information, for example an authorization password.

In addition, it is to be noted that, in embodiments of the disclosure, after the user account server passes the verification of the received first account, the user account server authorizes the mobile device to access the authorization proxy server. An operation of triggering the user account server to verify the first account is performed after the user account server has received a login request carrying the first account from the mobile device. The operation that the mobile device sends the login request carrying the first account may include: after the vehicle manufacture account serve passes the verification on the vehicle and the vehicle owner identity, and the TSP server generates a link based on verification pass information and sends the generated link to the vehicle-home interconnection APP for display, the mobile device sends a login request carrying the first account to the user account server according to login information of the first account received through the link. For example, the link is displayed in the form of a two-dimensional code on the vehicle-home interconnection APP, and the mobile device obtains a login page of the user account server by scanning the two-dimensional code, and receives the first account input by the user, so as to log into the user account server. When the mobile device has logged into the user account server, the user account server would issue verification information to the mobile device and authorize the mobile device to log into the authorization proxy server.

In one or more embodiments, the operation of generating the associating record for the first account carried in the access request, in response to determining that the access request carries the verification information includes:

in response to determining that the access request carries the verification information, sending an authorization request carrying the verification information to the user account server;

receiving an authorization password which is issued by the user account server after succeeding in verification with the verification information; and generating the associating record in response to receiving the authorization password.

In some embodiments, when determining that the access request carries the verification information, the authorization proxy server sends an authorization request carrying the verification information to the user account server. The user account server matches the received verification information with information preconfigured in the user account server, and issues an authorization password when the matching is successful. The authorization password is a type of authorization information.

For example, when the verification information is address information of the authorization proxy server, the user account server would verify whether the address information carried in the access request is consistent with address information stored in the user account server per se, and would issue an authorization password, such as a token, when a result of the verification indicates consistency.

When receiving the authorization password issued by the user account server, the authorization proxy server would identify the first account to be an authorized account, and generate, in the authorization proxy server, an associating record of the first account having been associated with the user account server, namely, identifying that the first account is an authorized account.

In some embodiments, the first account's control right for controlling the device to be controlled is obtained by the authorization proxy server applying from the user account server. The reason is that a service for controlling a device to be controlled is well developed, it also needs a right to access a smart device control service, and services, provided by different manufactures, for controlling devices to be controlled are not unified. Therefore, when accessing, through a vehicle-home interconnection APP, a service for controlling a device to be controlled, a user account server for managing smart device control services is needed, so as to manage control services provided by different manufactures in a centralized manner. Acquiring authorization from the user account server through the authorization proxy server prevents an account of the smart device control service from being divulged to the vehicle-mounted terminal, so as to improve the convenience and security in accessing the smart device control service.

In one or more embodiments, the method for processing information applied to the authorization proxy server further includes:

issuing the authorization password to the first account. The authorization password is used for the first account to control the device to be controlled.

In some embodiments, the authorization proxy server would also issue an authorization password to the first account, that is, establishing a correspondence between the first account and the authorization password in the authorization proxy server. Based on the established correspondence, when the vehicle-home interconnection APP is started, the TSP server supporting operation of the vehicle-home interconnection APP may obtain the corresponding authorization password from the authorization proxy server based on the first account.

On one hand, the function of obtaining the authorization password by the TSP server is to enable the TSP server to acquire predetermined information of the device to be controlled from a smart device control server managing the device to be controlled. After obtaining the predetermined information, the TSP server sends the predetermined information to the vehicle-mounted terminal so as to display the predetermined information in the vehicle-home interconnection APP. On the other hand, the function of obtaining the authorization password by the TSP server is to enable the TSP server to access the smart device control server based on a token after receiving an operation instruction forwarded by the vehicle-home interconnection APP. In this way, the smart device control server controls the device to be controlled to perform the operation instruction.

It is to be understood that, in some embodiments, based on the token issued to the first account, access has to be realized with the authorization password when the vehicle-mounted terminal is associated with the device to be controlled, for example, when displaying, on the vehicle-mounted terminal, the predetermined information of the device to be controlled, or when controlling, based on a received operation instruction, the device to be controlled. Therefore, the security in controlling the device to be controlled can be improved.

In one or more embodiments, the access request further carries vehicle identification information of the first vehicle-mounted terminal. The method for processing information applied to the authorization proxy server further includes:

generating an authorization code according to the vehicle identification information.

The operation of in response to determining that the access request carries the verification information, sending the authorization request carrying the verification information to the user account server includes: in response to determining that the access request carries the verification information, sending an authorization request carrying the verification information and the authorization code to the user account server.

The operation of receiving the authorization password which is issued by the user account server after succeeding in verification with the verification information includes: receiving the authorization password which is issued, based on the authorization code, by the user account server after succeeding in the verification with the verification information.

As state above, after the TSP server sends, based on verification pass information from the vehicle manufacture account server, a generated link to the vehicle-home interconnection APP for display, the mobile device sends the login request to the user account server according to login information of the first account received through the link, so as to be authorized by the user account server to send an access request to the authorization proxy server.

It is to be noted that, in some embodiments, the link for logging into the user account server generated by the TSP server carries vehicle identification information already configured in the vehicle-mounted terminal. When logging into the user account server based on the link, the mobile device obtains vehicle identification information carried in the link. When the mobile device is authorized by the user account server to access the authorization proxy server, the access request also carries vehicle identification information.

When receiving the access request carrying the vehicle identification information of the first vehicle-mounted terminal, the authorization proxy server will generate an authorization code according to the vehicle identification information. The user account server will issue an authorization password based on the authorization code after succeeding in verification with the verification information.

It is to be noted that, in some embodiments, the authorization code is valid in a certain time period, and can only be used once. Therefore, in the disclosure, an authorization proxy server generates an authorization code, and a user account server issues an authorization password after success in verification, so that the security in authorization of a first account can be improved.

In one or more embodiments, the method for processing information applied to the authorization proxy server further includes: sending the authorization password to a vehicle manufacture account server corresponding to the first vehicle-mounted terminal.

As described above, the authorization information not only can be stored in the authorization proxy server, but also can be stored in the vehicle manufacture account server. When the authorization password which is a type of authorization information is stored in the vehicle manufacture account server, based on the first account of the vehicle-home interconnection APP in the first vehicle-mounted terminal and based on an associating record stored in the authorization proxy server or the vehicle manufacture account server, the TSP server can acquire the authorization password from the vehicle manufacture account server and then realize controlling of the device to be controlled, when it is labelled in the associating record that the first account is an authorized account.

In one or more embodiments, the operation of authorizing the first account with a control right for controlling a device to be controlled, in response to the first account being the authorized account that has been associated with the user account service includes: in response to the first account and an authorized second account being associated with a same vehicle owner identity, authorizing the first account with a control right of the second account.

Here, because correspondences exist between accounts and vehicle attributes, the first account corresponds to a vehicle owner identity associated with the first vehicle-mounted terminal, and the second account corresponds to a vehicle owner identity associated with the second vehicle-mounted terminal. However, one vehicle owner may own different vehicles, and therefore, the first account and the second account may be associated with a same vehicle owner identity.

It is to be noted that, in some embodiments, whether the first account and the second account are associated with a same vehicle owner identity may be determined by the authorization proxy server. For example, in the associating record of the authorization proxy server, not only whether each account is an authorized account is labelled, but also a corresponding vehicle owner identity is also recorded. In response to determining that the vehicle owner identity corresponding to the first account is also associated with an authorized second account, the authorization proxy server authorizes the first account with both a control right currently corresponding to the first account and a control right corresponding to the second account.

For example, a user owns a Benz car and a BMW car. When a first account of the Benz car is authorized to have a control right of controlling a purifier, and a second account of the BMW car is authorized to a control right of controlling an electric cooker. When determining that the first account and the second account are both associated with a same vehicle owner identity, the authorization proxy server will authorize the first account with both an authorization password of the first account and an authorization password of the second account. As such, based on two authorization passwords returned by the authorization proxy server, the TSP server would acquire predetermined information of the purifier and predetermined information of the electric cooker from the smart device control server, and display the predetermined information on the vehicle-home interconnection APP in the BMW car. Of course, when the user starts the vehicle-home interconnection APP in the Benz car, the predetermined information of the purifier and the electric cooker can also be displayed.

It is to be understood that, in some embodiments, when determining that a first account is an authorized account through an associating record, control rights of other accounts associated with a same vehicle owner identity as the first account can be further obtained, realizing sharing of control rights corresponding to multiple vehicles (multiple vehicle-home interconnection APP accounts, and multiple vehicle identification numbers (VINs) of one owner. A user does not need to set, for vehicles one by one, a control right for controlling a device to be controlled, and thus usage experience of the user is improved.

In one or more embodiments, the operation of authorizing the first account with the control right of the second account includes: authorizing the first account with a preset control mode, for controlling the device to be controlled, stored in the second account.

Here, the operation of acquiring the control right of the second account by the first account includes associating the first account with predetermined information of a device to be controlled associated with the second account, and enabling the device to be controlled associated with the second account to perform an operation instruction based on the displayed predetermined information.

The control right of the second account acquired by the first account further includes a right to use a preset control mode stored in the second account.

The preset control mode includes: based on driving state information of a vehicle identified by the second account, triggering an automatic trigger mode of an operation state of the device to be controlled.

The driving state information includes but is not limited to a current position of a vehicle position and/or a current driving rate of the vehicle.

For example, a distance from the current position of the vehicle to a position of the device to be controlled is compared with a distance threshold. If a comparison result is that the distance from the current position of the vehicle to the position of the device to be controlled is smaller than or equal to the distance threshold, the device to be controlled operates with preset operation parameters in the preset control mode, for example, the device to be controlled starts.

For another example, if it is predicted, based on the current driving rate of the vehicle, that the time that will be taken for the vehicle identified by the second account to reach the position of the device to be controlled is smaller than a time threshold, an automatic trigger mode of an operation state of the device to be controlled is triggered. For example, a water heater is triggered to start, so as to heat water. In some embodiments, for example, a smart scenario is provided in the Benz car: an electric cooker starts to cook when the car is less than 5 kilometers from home. When a user drives the BMW car one day, and travels to a position less than 5 kilometers from home, a smart recommendation function may be provided to recommend the owner of the BMW car to start the electric cooker to cook.

It is to be understood that, in some embodiments, it is the authorization proxy server that determines whether a first account of a first vehicle-mounted terminal is an authorized account. The first account is authorized with a control right for controlling a device to be controlled, only if it is determined that the first account is an authorized account.

On the one hand, the security in controlling a device to be controlled is improved. On the other hand, whether a first account is an authorized account is determined by an authorization proxy server, rather than a device-end server directly managing the device or a server serving for a first vehicle-mounted terminal; and thus, a device-end service oriented at different vehicle-mounted terminal manufactures and different devices to be controlled can be provided through the authorization proxy server, thus improving the universality of the vehicle-mounted terminal in controlling different devices to be controlled.

Figure 2:
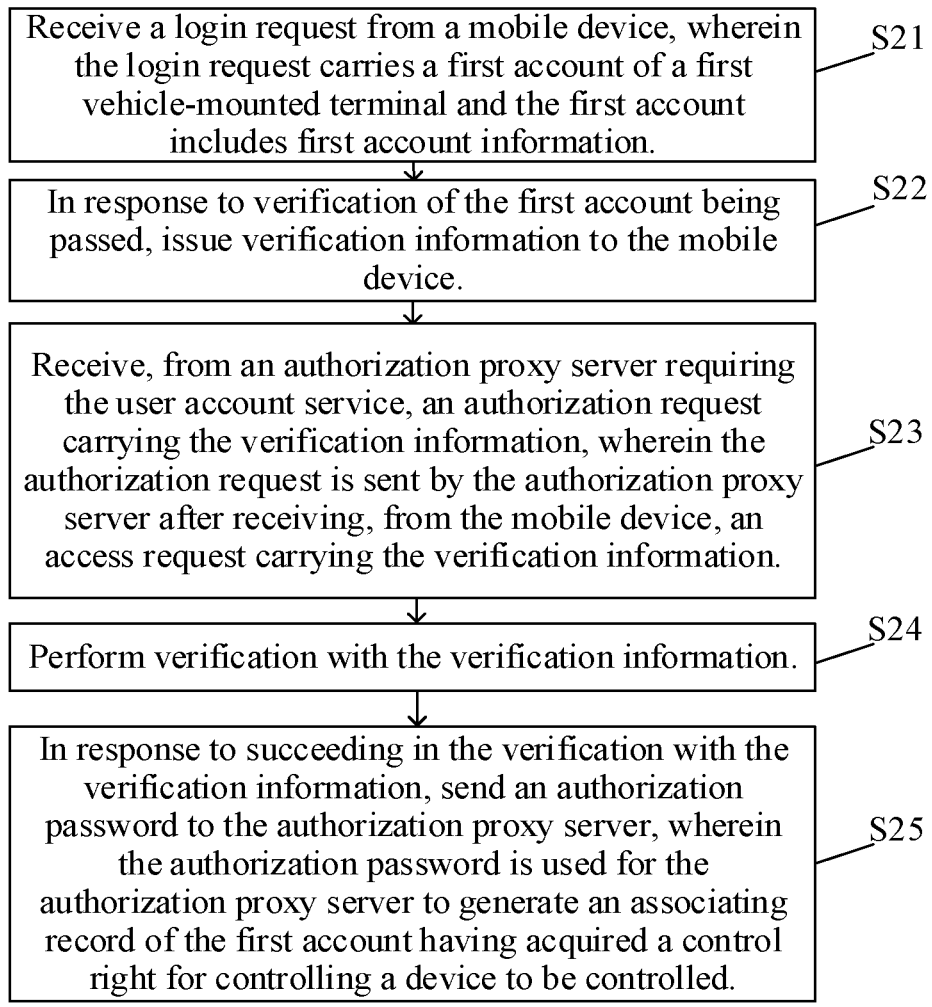
FIG. 2 illustrates a second flow chart of a method for processing information, according to an example of the present disclosure.

FIG. 2 illustrates a second flow chart of a method for processing information according to embodiments of the disclosure. The method for processing information is applied to a user account server providing a user account service, and as illustrated in FIG. 2, includes the following steps.

In step S21, a login request is received from a mobile device. The login request carries a first account of a first vehicle-mounted terminal.

In step S22, in response to verification of the first account being passed, verification information is issued to the mobile device.

In step S23, an authorization request carrying the verification information is received from an authorization proxy server requiring the user account service. The authorization request is sent by the authorization proxy server after receiving, from the mobile device, an access request carrying the verification information.

In step S24, verification is performed with the verification information.

In step S25, in response to success in the verification with the verification information, an authorization password is sent to the authorization proxy server. The authorization password is used for the authorization proxy server to generate an associating record of the first account having acquired a control right for controlling a device to be controlled.

In some embodiments, the user account server may be a server oriented at different smart device control service manufactures. When external interfaces provided services of devices to be controlled from different manufacturers are not consistent with each other, the user account server works together with the authorization proxy server to enable the vehicle-home interconnection APP to be oriented at different vehicle manufacture services and different services of devices to be controlled.

In step S21, the user account server receives a login request from a mobile device. For example, the link is displayed in the form of a two-dimensional code on the vehicle-home interconnection APP, and the mobile device obtains a login page of the user account server by scanning the two-dimensional code, and receives the first account input by the user, so as to log into the user account server. The login request received by the user account server carries a first account.

In step S22, the user account server verifies whether the first account is a prestored account. When it is determined that the first account is a prestored account, the verification is passed; then verification information is issued to the mobile device. It is to be noted that, in embodiments of the disclosure, a first account registered by a user based on a first vehicle-home interconnection APP would also be transferred to the user account server through a TSP server supporting operation of the vehicle-home interconnection APP. Through the backup at the user account server, the user account server can learn the source of the account, and perform a subsequent authorization process.

In one or more embodiments, relevant information of the authorization proxy server is stored in the user account server, and the verification information may be identification information of an authorization proxy service, provided by the user account server for the mobile device, so that the mobile device can quickly access the authorization proxy server based on the access request carrying the verification information, so as to simplify the process of authorizing the first account.

For example, the user account server sends address information of the authorization proxy server to the mobile device, so that the mobile device can send an access request to the authorization proxy server based on the address information.

In step S23, the user account server receives an authorization request carrying the verification information from the authorization proxy server. It is to be noted that the authorization request is sent by the authorization proxy server after determining that the access request from the mobile device carries the verification information.

When the access request received by the authorization proxy server does not carry verification information previously issued by the user account server, it indicates that the first account carried in the access request may be an authorized account. At this time, the user account server will not receive an authorization request from the authorization proxy server either.

In step S24, the user account server performs verification with the verification information after receiving the authorization request from the authorization proxy server. The purpose of performing verification is to enable the user account server to confirm whether an object to which an authorization password is to be sent is an object predetermined by the user account server, that is, whether the object is a preconfigured authorization proxy server.

In step S25, after succeeding in verification, the user account server sends an authorization password to the authorization proxy server, so that the authorization proxy server can generate an associating record.

In some embodiments, before the first account obtains a control right, the mobile terminal logs into the user account server so that the user account server sends an authorization password to the authorization proxy server, without divulging login information of the user account server to the authorization proxy server, thus promoting the protection of account security.

In one or more embodiments, the verification information includes address information, and step S24 includes: verifying whether the address information carried in the authorization request is consistent with pre-stored address information of the authorization proxy server.

In one or more embodiments, the access request further carries vehicle identification information of the first vehicle-mounted terminal, and the authorization request further carries an authorization code which is generated by the authorization proxy server according to the vehicle identification information.

Step S25 includes: in response to success in the verification, sending, based on the authorization code, the authorization password to the authorization proxy server.

In one or more embodiments, an access request of the mobile device requesting to access the authorization proxy server further carries vehicle identification information, so that the authorization proxy server generates, according to the vehicle identification information, a credential for applying for an authorization password to the user account server. The credential is an authorization code. It is to be noted that the vehicle identification information is an inherent attribute of the vehicle-mounted terminal, and is obtained when the mobile device interacts with the vehicle-home interconnection APP in the vehicle-mounted terminal.

Here, the user account server will issue an authorization password based on the authorization code after succeeding in verification with the verification information. The authorization code is valid in a certain time period and can only be used once. Therefore, in the disclosure, an authorization proxy server generates an authorization code, and a user account server issues an authorization password after succeeding in verification, so that the security in authorization of a first account can be improved.

The authorization proxy server can generate, based on the obtained authorization password, an associating record of the first account having acquired a control right for controlling the device to be controlled, so that the control right of the first account for controlling the device to be controlled can be obtained according to the associating record subsequently.

It is to be understood that, in some embodiments, the user account server authorizes the first account with the control right for controlling the device to be controlled, without the need for a smart device control server to be directly interfaced with the vehicle-mounted terminal. On one hand, the vehicle-home interconnection APP may be oriented at different services of devices to be controlled. On the other hand, before the first account obtains the control right, the user account server issues, based on a login request of the mobile device, an authorization password to the authorization proxy server, which promote the protection of account security.

Figure 3:
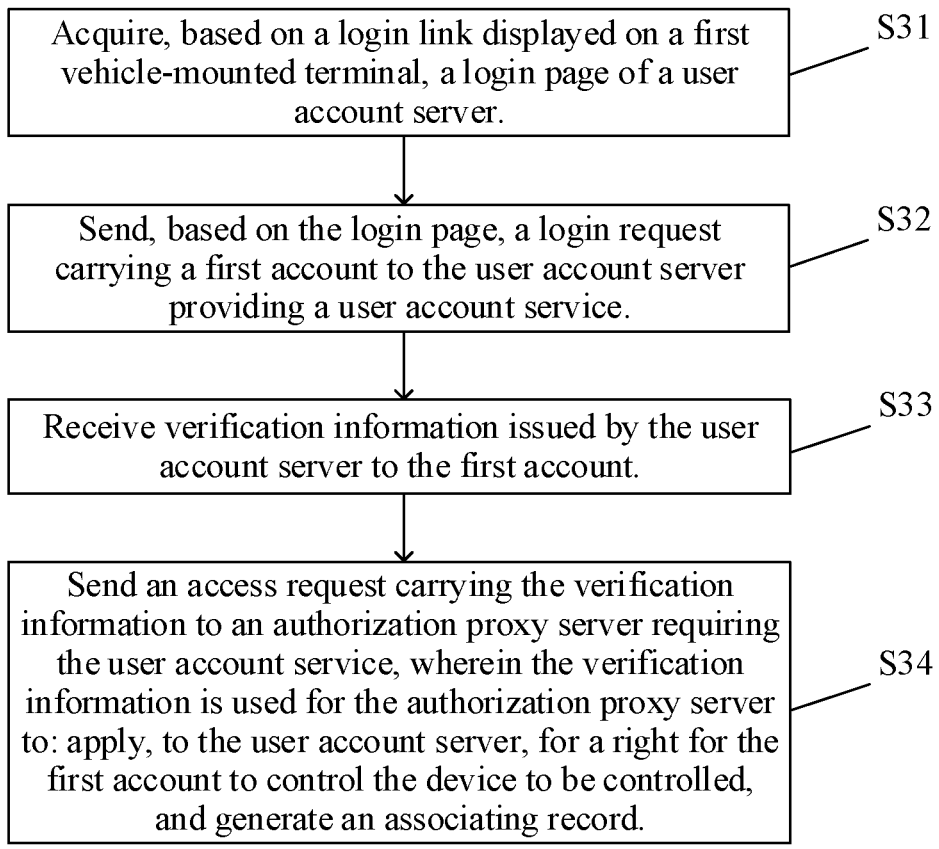
FIG. 3 illustrates a third flow chart of a method for processing information, according to an example of the present disclosure.

FIG. 3 illustrates a third flow chart of a method for processing information according to embodiments of the disclosure. The method for processing information is applied to a mobile device, and as illustrated in FIG. 3, includes the following steps.

In step S31, a login page of a user account server is acquired based on a login link displayed on a first vehicle-mounted terminal.

In step S32, a login request carrying a first account is sent, based on the login page, to the user account server providing a user account service.

In step S33, verification information issued by the user account server to the first account is received.

In step S34, an access request carrying the verification information is sent to an authorization proxy server requiring the user account service. The verification information is used for the authorization proxy server to: apply, to the user account server, for a right for the first account to control the device to be controlled, and generate an associating record.

In some embodiments, the mobile device may be a mobile phone, a tablet, etc. In steps S31, the mobile device may acquire a login page of a user account server, based on a login link displayed on a first vehicle-mounted terminal.

It is to be noted that, the login link is displayed on the first vehicle-mounted terminal in the following way: based on that the verification performed on the vehicle and the vehicle owner identity by the vehicle manufacture account server is passed, the TSP server sends, based on verification pass information, a generated link to the vehicle-home interconnection APP for display. The link is used for the mobile device to log into the user account server.

Exemplarily, the link is displayed in the form of a two-dimensional code. A mobile phone scans the two-dimensional code to enter a login page of the user account server, based on a two-dimensional code scanning function provided in the mobile phone.

In step S32, the mobile device sends, based on a first account input by a user on the login page, a login request carrying the first account to the user account server.

It is to be noted that the login request further carries vehicle identification information corresponding to the first account.

The mobile device receives, in step S33, verification information issued by the user account server to the first account, and sends an access request carrying the verification information to the authorization proxy server in step S34.

The verification information may be address information of the authorization proxy server. The verification information is used for the authorization proxy server to: apply, to the user account server, for a right for the first account to control the device to be controlled, and generate an associating record.

In one or more embodiments, the method further includes: receiving, from the authorization proxy server, authorization result information of the first account; and outputting the authorization result information.

Here, when the authorization proxy server has obtained the authorization password from the user account server, it indicates that the first account has been authorized. At this time, the mobile device will receive authorization result information of the first account from the authorization proxy server, and output the authorization result information by voice playing or screen display, so as to inform the user.

It is to be understood that, in some embodiments, before the first account obtains the control right, the mobile device logs into the user account server, and the user account server finally issues an authorization password to the authorization proxy server, so that the protection of account security is improved.

Figure 4:
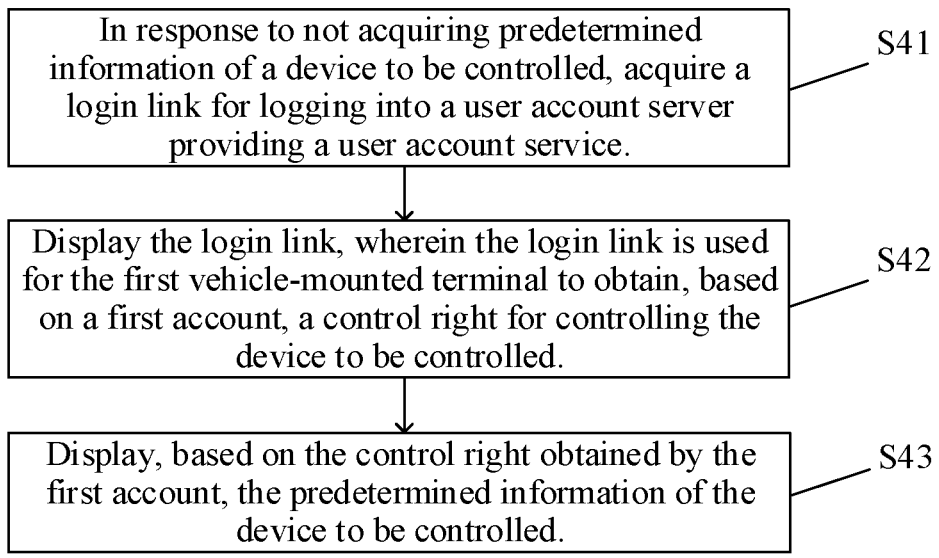
FIG. 4 illustrates a fourth flow chart of a method for processing information, according to an example of the present disclosure.

FIG. 4 illustrates a fourth flow chart of a method for processing information according to embodiments of the disclosure. The method for processing information is applied to a first vehicle-mounted terminal, and as illustrated in FIG. 4, includes the following steps.

In step S41, in response to not acquiring predetermined information of a device to be controlled, a login link for logging into a user account server providing a user account service is acquired.

In step S42, the login link is displayed. The login link is used for the first vehicle-mounted terminal to obtain, based on a first account, a control right for controlling the device to be controlled.

In step S43, the predetermined information of the device to be controlled is displayed based on the control right obtained by the first account.

In some embodiments, the first vehicle-mounted terminal is a control terminal mounted on a vehicle. The control terminal may receive an operation instruction from a user so as to control a navigation application integrated in the control terminal, a radio application integrated in the control terminal, and an associated device to be controlled.

The vehicle-mounted terminal is installed with an application (APP) that can control a device to be controlled, for example, a vehicle-home interconnection APP. The vehicle-home interconnection APP, after being started, may display, based on a first account input by a user, predetermined information of a device to be controlled, so as to control the device to be controlled, when it is determined that the first account is an authorized account having obtained a control right for controlling the device to be controlled. In an embodiment, the vehicle-home interconnection APP forwards, through a TSP server supporting operation of the vehicle-home interconnection APP, an operation instruction for controlling the device to be controlled to a smart device control server, and enables, based on a control right, the smart device control server to control the device to be controlled to perform the operation instruction.

However, when the vehicle-home interconnection APP fails to acquire predetermined information of the device to be controlled, it indicates that the first account has not been authorized. Therefore, the vehicle-home interconnection APP will acquire a login link for logging into a user account server, so as to enable, through a mobile device, an authorization proxy server to obtain authorization information from the user account server. The authorization information may be an authorization password, such as a token.

In one or more embodiments, the step S41 includes operation of sending an acquisition request to a vehicle-mounted central control server serving for the first vehicle-mounted terminal. The acquisition request carries vehicle identification information of the first vehicle-mounted terminal and information of a vehicle owner identity. The step S41 further includes receiving the login link fed back by the vehicle-mounted central control server. The login link is generated by the vehicle-mounted central control server, after obtaining, based on the vehicle identification information and the information of the vehicle owner identity, verification pass information from a vehicle manufacture account server.

Here, the vehicle-mounted central control server is the TSP server supporting operation of the vehicle-home interconnection APP. When started, the vehicle-home interconnection APP can send, through the TSP server, the vehicle identification information and the information of the vehicle owner identity to the vehicle manufacture account server, so that the vehicle manufacture account server determines whether the vehicle is a registered vehicle. Only if the vehicle manufacture account server has determined that the vehicle is a registered vehicle, the TSP server will generate a login link, so as to apply, for the first account of the vehicle-home interconnection APP, a control right for controlling the device to be controlled.

In step S42, the vehicle-home interconnection APP in the first vehicle-mounted terminal displays the login link. The displayed login link is used for the mobile device to log into the user account server, so that the authorization proxy server finally obtains an authorization password from the user account server and generate an associating record for the first account. When it is identified in the associating record that the first account is an authorized account, it indicates that the first account has obtained a control right for controlling the device to be controlled.

In step S43, the first vehicle-mounted terminal can display, based on the control right obtained by the first account, predetermined information of the device to be controlled.

In one or more embodiments, the method further includes detecting an operation instruction on the predetermined information. The operation instruction is used for the first vehicle-mounted terminal to trigger, based on the control right obtained by the first account, the device to be controlled to execute the operation instruction.

Here, after displaying the predetermined information of the device to be controlled, the first vehicle-mounted terminal may detect an operation instruction on the predetermined information. The operation instruction is an instruction for controlling the device to be controlled to perform an operation.

It is to be noted that, the device to be controlled also needs to perform the operation based on the control right of the first account. In an embodiment, when the vehicle-mounted terminal forwards, through the TSP server, an operation instruction to the smart device control server to realize controlling the device to be controlled, the TSP server also needs to access the smart device control server based on a token. In this way, the security in controlling a device to be controlled can be improved.

In one or more embodiments, the control right obtained by the first account includes a control right of a second account. The second account is an authorized account, and the second account and the first account are associated with a same vehicle owner identity.

Here, because correspondences exist between accounts and vehicle attributes, the first account corresponds to a vehicle owner identity associated with the first vehicle-mounted terminal, and the second account corresponds to a vehicle owner identity associated with the second vehicle-mounted terminal. However, one vehicle owner may own different vehicles, and therefore, the first account and the second account may be associated with a same vehicle owner identity.

For example, a user owns a Benz car and a BMW car. When a first account of the Benz car is authorized with a control right of controlling a purifier, and a second account of the BMW car is authorized with a control right of controlling an electric cooker. When the first account and the second account are associated with a same vehicle owner identity, if a user drives the BMW car, predetermined information of both the purifier and the electric cooker will be displayed on the vehicle-home interconnection APP in the BMW car. Of course, when the user starts the vehicle-home interconnection APP in the Benz car, the predetermined information of the purifier and the electric cooker can also be displayed.

In one or more embodiments, the control right of the second account includes a preset control mode, for controlling the device to be controlled, stored in the second account.

Here, the operation of acquiring the control right of the second account by the first account includes associating the first account with predetermined information of a device to be controlled associated with the second account, and enabling the device to be controlled associated with the second account to perform an operation instruction based on the displayed predetermined information.

The control right of the second account acquired by the first account further includes a right to use a preset control mode stored in the second account.

The preset control mode includes: based on driving state information of a vehicle identified by the second account, triggering an automatic trigger mode of an operation state of the device to be controlled.

The driving state information includes but is not limited to a current position of a vehicle position and/or a current driving rate of the vehicle.

For example, a distance from the current position of the vehicle to a position of the device to be controlled is compared with a distance threshold. If a comparison result is that the distance from the current position of the vehicle to the position of the device to be controlled is smaller than or equal to the distance threshold, the device to be controlled operates with preset operation parameters in the preset control mode, for example, the device to be controlled starts.

For another example, if it is predicted, based on the current driving rate of the vehicle, that the time that will be taken for the vehicle identified by the second account to reach the position of the device to be controlled is smaller than a time threshold, an automatic trigger mode of an operation state of the device to be controlled is triggered. For example, a water heater is triggered to start, so as to heat water.

In some embodiments, for example, a smart scenario is provided in the Benz car: an electric cooker starts to cook when the car is less than 5 kilometers from home. When a user drives the BMW car one day, and travels to a position less than 5 kilometers from home, recommendation information recommending to start the electric cooker to cook will be output on the vehicle-home interconnection APP in the BMW car.

It is to be understood that, in some embodiments, when determining that a first account is an authorized account through an associating record, control rights of other accounts associated with a same vehicle owner identity as the first account can be further obtained, realizing sharing of control rights corresponding to multiple vehicles (multiple vehicle-home interconnection APP accounts, and multiple VINs) of one owner. A user does not need to set, for vehicles one by one, a control right for controlling a device to be controlled, and thus usage experience of the user is improved.

It is to be understood that, in some embodiments, a first vehicle-mounted terminal displays a login link for logging into a user account server, to enable a first account to be authorized by a user account server, so that predetermined information of a device to be controlled can be displayed, so as to control the device to be controlled. On one hand, the first vehicle-mounted terminal generates the login link for logging into the user account server, which brings convenience for the first account to be authorized by the user account server. On the other hand, the predetermined information of the device to be controlled is displayed, user operation is facilitated, and usage experience of the user can be improved.

Figure 5:
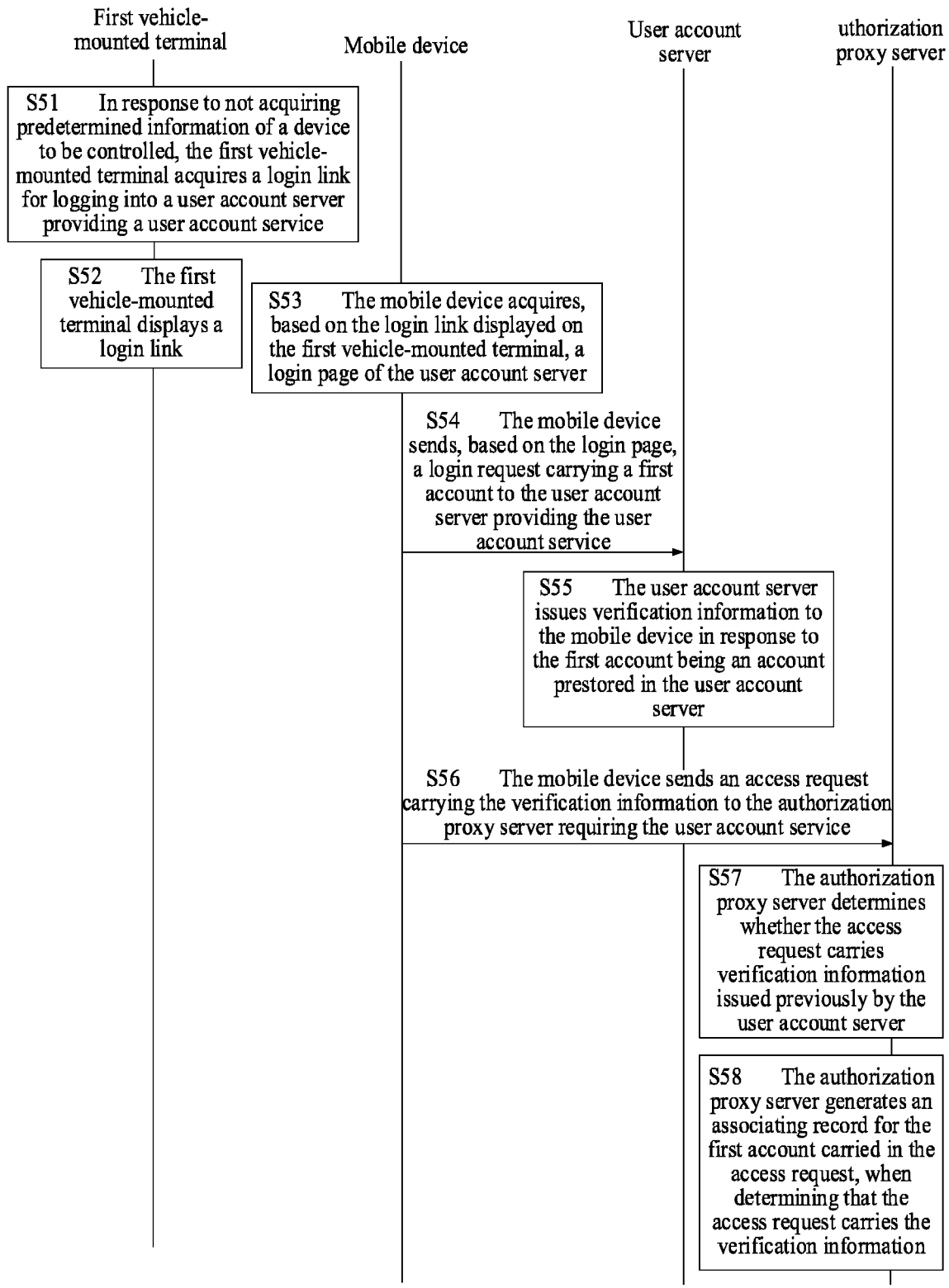
FIG. 5 illustrates a flow chart of interaction of a method for processing information, according to an example of the present disclosure.

FIG. 5 illustrates a flow chart of interaction of a method for processing information according to embodiments of the disclosure. As illustrated in FIG. 5, the method for processing information applied to an authorization proxy server, a user account server, a mobile device and a first vehicle-mounted terminal is a method for generating an associating record for a first account, and includes the following steps.

In step S51, in response to not acquiring predetermined information of a device to be controlled, the first vehicle-mounted terminal acquires a login link for logging into a user account server providing a user account service.

In step S52, the first vehicle-mounted terminal displays a login link.

In step S53, the mobile device acquires, based on the login link displayed on the first vehicle-mounted terminal, a login page of the user account server.

In step S54, the mobile device sends, based on the login page, a login request carrying a first account to the user account server providing the user account service.

In step S55, the user account server issues verification information to the mobile device in response to the first account being an account prestored in the user account server.

In step S56, the mobile device sends an access request carrying the verification information to the authorization proxy server requiring the user account service.

In step S57, the authorization proxy server determines whether the access request carries verification information issued previously by the user account server.

In step S58, the authorization proxy server generates an associating record for the first account carried in the access request, when determining that the access request carries the verification information.

It is to be understood that, in some embodiments, a first vehicle-mounted terminal displays a login link for logging into a user account server, and an authorization proxy server and a user account server perform information interaction with each other, so that the authorization proxy server can generate an associating record of a first account having been associated with the user account server. On one hand, during subsequent control of the device to be controlled, a control right needs to be obtained based on the associating record, so that the security in controlling the device to be controlled can be improved. On the other hand, the authorization proxy server and the user account server interact with each other, so that the authorization proxy server can generate an associating record, and the vehicle-mounted terminal does not directly access a server side managing the device to be controlled; accordingly, authorization proxy server and the user account server may provide services for device ends of different vehicle-mounted terminal manufactures and different devices to be controlled. Therefore, the universality of the vehicle-mounted terminal in controlling a device to be controlled is improved.

Figure 6:
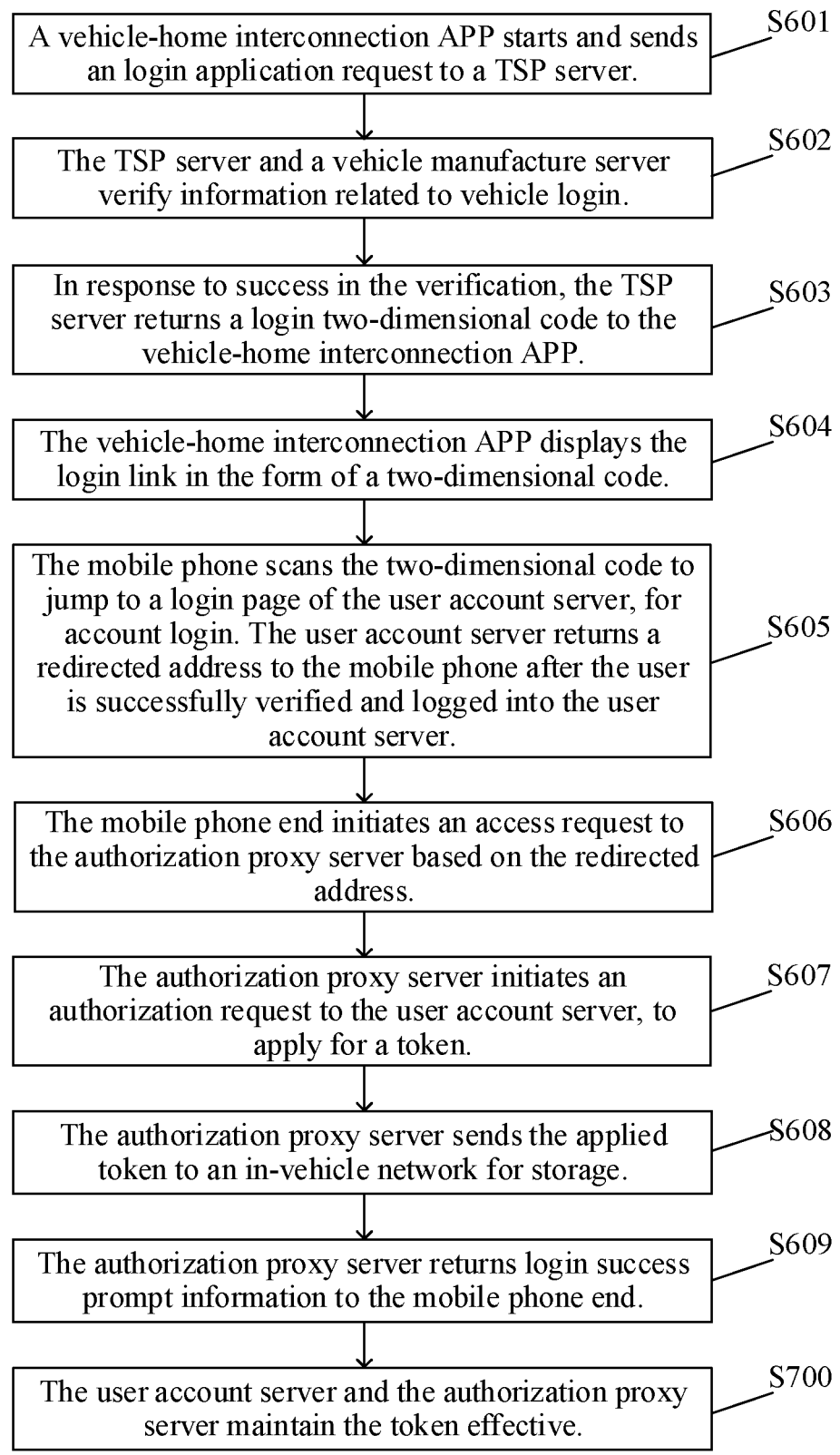
FIG. 6 illustrates a schematic diagram of an account authorization method, according to an example of the present disclosure.
Figure 7:
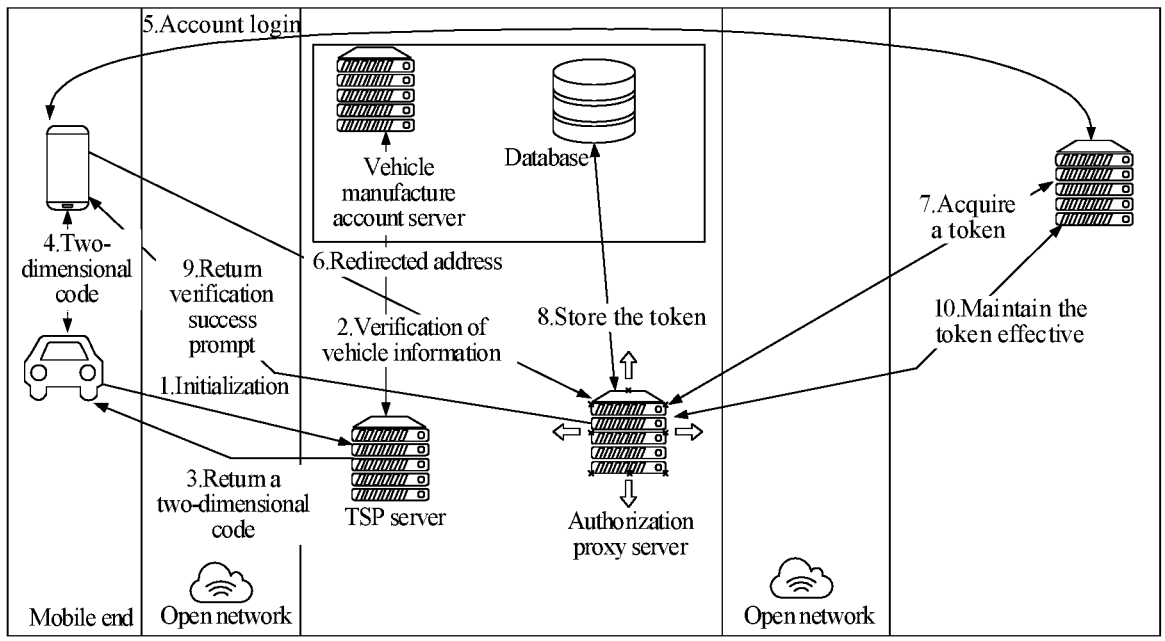
FIG. 7 is a diagram illustrating instruction interaction between devices in the method for processing information, according to an example of the present disclosure.

FIG. 6 illustrates a schematic diagram of an account authorization method according to embodiments of the disclosure. FIG. 7 illustrates instruction interaction between devices corresponding to the method for processing information in FIG. 6. As illustrated in FIG. 6 and FIG. 7, the account authorization method includes the following steps.

In step S601, a vehicle-home interconnection APP is started and sends a login application request to a TSP server.

It is to be noted that, as step 1 in FIG. 7, the vehicle-home interconnection APP completes initialization and account login after being started. When no predetermined information of a device to be controlled is displayed on a display screen of a vehicle-mounted terminal, it indicates that the vehicle-mounted terminal has not been associated with the device to be controlled. The vehicle-home interconnection APP sends a login application request to the TSP server. The login application request carries vehicle information which includes a VIN of a vehicle and user identity information.

In step S602, the TSP server and a vehicle manufacture server verify information related to vehicle login.

In some embodiments, as step 2 in FIG. 7, the vehicle manufacture account server and the TSP perform information interaction with each other. In an embodiment, the TSP server sends vehicle information to the vehicle manufacture account server, so that the vehicle manufacture account server verifies whether a vehicle identified by the vehicle information is a registered vehicle and sends a verification result to the TSP server.

In step S603, in response to success in the verification, the TSP server returns a login two-dimensional code to the vehicle-home interconnection APP.

In some embodiments, as step 3 FIG. 7, the TSP server receives verification success information from the vehicle manufacture account server, and generates a two-dimensional code information carrying the VIN and returns the two-dimensional code information to the vehicle-home interconnection APP. For example, the login two-dimensional code is a login link for logging into a user account server.

In step S604, the vehicle-home interconnection APP displays the login link in the form of a two-dimensional code.

As step 4 in FIG. 7, a mobile phone may scan the login link displayed by vehicle-home interconnection APP the in the form of a two-dimensional code. The mobile phone is the mobile phone in some embodiments.

In step S605, the mobile phone scans the two-dimensional code to jump to a login page of the user account server, for account login. The user account server returns a redirected address to the mobile phone after the user is successfully verified and logged into the user account server.

In some embodiments, as step 5 in FIG. 7, the mobile phone scans the two-dimensional code to jump to the login page of the user account server. The user account server can be logged into based on account information input by the user on the mobile phone. Exemplarily, the input account information is the first account.

The user account server returns a redirected address to the mobile phone after the user is successfully verified and logged into the user account server. The redirected address is the verification information in embodiments of the disclosure, and is an access address of the authorization proxy server.

In step S606, the mobile phone end initiates an access request to the authorization proxy server based on the redirected address.

In some embodiments, the access request includes the redirected address and the VIN. The authorization proxy server may provide an OAuth-protocol-based security authentication service, and the authorization proxy server may also be referred to as an OAuth Client server. Based on the VIN carried in the access request, the OAuth Client server generates a corresponding authorization code.

As step 6 in FIG. 7, the mobile phone initiates an access request to the authorization proxy server based on the redirected address.

In step S607, the authorization proxy server initiates an authorization request to the user account server, to apply for a token.

In some embodiments, the access request carries the redirected address, the VIN and the authorization code. The user account server verifies whether the redirected address carried in the access request is consistent with an address previously stored by the user account server.

If being consistent, the user account server issues a token to the OAuth Client server according to the authorization code. The token is an authorization password.

As step 7 in FIG. 7, the authorization proxy server acquires the token from the user account server.

In step S608, the authorization proxy server sends the applied token to an in-vehicle network for storage.

It is to be noted that, the in-vehicle network is a memory corresponding to the vehicle manufacture account server. As step 8 in FIG. 7, the authorization proxy server stores the token in a database of the vehicle manufacture account server.

In step S609, the authorization proxy server returns login success prompt information to the mobile phone end.

As step 9 in FIG. 7, the authorization proxy server returns login success prompt information to the mobile phone end.

In step S700, the user account server and the authorization proxy server maintain the token effective.

As step 10 in FIG. 7, the user account server and the authorization proxy server maintain the token effective. It is to be noted that, maintaining the token effective and storing the token in the in-vehicle network make it possible to access a device to be controlled with one time of authorization, and there is no need to perform multiples times of authorization. In subsequent usage, the TSP server merely needs to acquire the token from the authorization proxy server.

Figure 8:
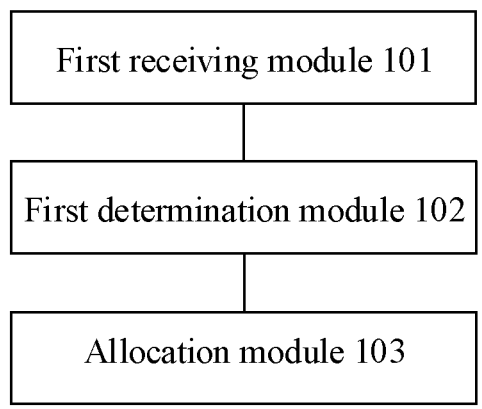
FIG. 8 illustrates a first diagram of a device for processing information, according to an example of the present disclosure.

FIG. 8 illustrates a first diagram of a device for processing information according to an embodiment of the disclosure. The device for processing information is applied to an authorization proxy server, and as illustrated in FIG. 8, includes a first receiving module 101, a first determination module 102 and an allocation module 103.

The first receiving module 101 is configured to receive a first account of a first vehicle-mounted terminal.

The first determination module 102 is configured to determine, based on an associating record of a user account service, whether the first account is an authorized account that has been associated with the user account service.

The allocation module 103 is configured to: in response to the first account being the authorized account that has been associated with the user account service, authorize the first account with a control right for controlling a device to be controlled.

Optionally, servers providing the user account service include a user account server, and the associating record is generated by the authorization proxy server through the user account server in advance. The device further includes a second receiving module 104, a second determination module 105 and a first-generation module 106.

The second receiving module 104 is configured to receive an access request from a mobile device having been authorized to access the authorization proxy server.

The second determination module 105 is configured to determine whether the access request carries verification information previously issued by the user account server.

The first-generation module 106 is configured to: in response to determining that the access request carries the verification information, generate the associating record for the first account carried in the access request.

Optionally, the first generation module 106 is configured to: in response to determining that the access request carries the verification information, send an authorization request carrying the verification information to the user account server; receive an authorization password which is issued by the user account server after succeeding in verification with the verification information; and generate the associating record in response to receiving the authorization password.

Optionally, the device further includes a first issuing module 107.

The first issuing module 107 is configured to issue the authorization password to the first account. The authorization password is used for the first account to control the device to be controlled.

Optionally, the access request further carries vehicle identification information of the first vehicle-mounted terminal. The device further includes a second-generation module 108.

The second-generation module 108 is configured to generate an authorization code according to the vehicle identification information.

The first generation module is configured to: in response to determining that the access request carries the verification information, send an authorization request carrying the verification information and the authorization code to the user account server; and receive the authorization password which is issued, based on the authorization code, by the user account server after succeeding in verification with the verification information.

Optionally, the device further includes a first sending module 109.

The first sending module 109 is configured to send the authorization password to a vehicle manufacture account server corresponding to the first vehicle-mounted terminal.

Optionally, the verification information contains an access address of the authorization proxy server.

Optionally, the allocation module 103 is configured to: in response to the first account and an authorized second account being associated with a same vehicle owner identity, authorize the first account with a control right of the second account.

Optionally, the allocation module 103 is configured to authorize the first account with a preset control mode, for controlling the device to be controlled, stored in the second account.

Figure 9:
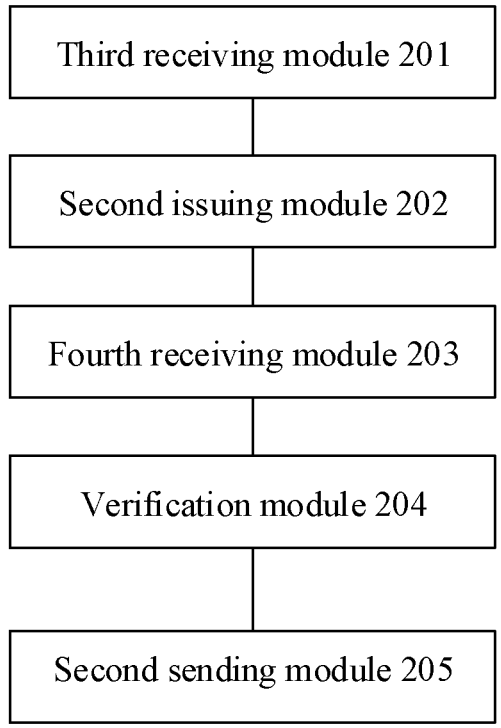
FIG. 9 illustrates a second diagram of a device for processing information, according to an example of the present disclosure.

FIG. 9 illustrates a second diagram of a device for processing information according to an embodiment of the disclosure. The device for processing information is applied to a user account server, and as illustrated in FIG. 9, includes a third receiving module 201, a second distribution module 202, a fourth receiving module 203, a verification module 204, and a second sending module 205.

The third receiving module 201 is configured to receive a login request from a mobile device. The login request carries a first account of a first vehicle-mounted terminal. The first account includes first account information.

The second distribution module 202 is configured to: in response to verification of the first account being passed, issue verification information to the mobile device.

The fourth receiving module 203 is configured to receive, from an authorization proxy server requiring the user account service, an authorization request carrying the verification information. The authorization request is sent by the authorization proxy server after receiving, from the mobile device, an access request carrying the verification information.

The verification module 204 is configured to perform verification with the verification information.

The second sending module 205 is configured to: in response to succeeding in the verification with the verification information, send an authorization password to the authorization proxy server. The authorization password is used for the authorization proxy server to generate an associating record of the first account having acquired a control right for controlling a device to be controlled.

Optionally, the verification information includes address information. The verification module is configured to verify whether the address information carried in the authorization request is consistent with pre-stored address information of the authorization proxy server.

Optionally, the access request further carries vehicle identification information of the first vehicle-mounted terminal, the authorization request further carries an authorization code which is generated by the authorization proxy server according to the vehicle identification information.

The second sending module 205 is configured to: in response to succeeding in the verification, send, based on the authorization code, the authorization password to the authorization proxy server.

Figure 10:
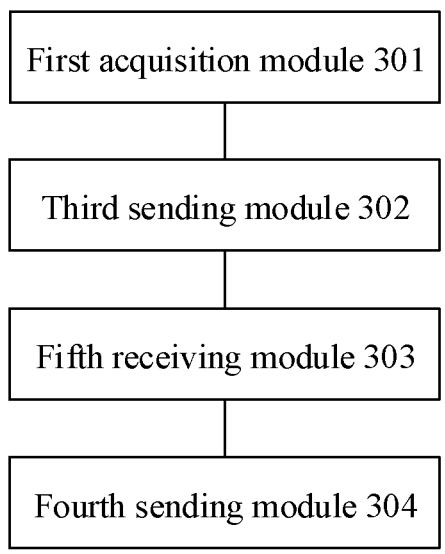
FIG. 10 illustrates a third diagram of a device for processing information, according to an example of the present disclosure.

FIG. 10 illustrates a third diagram of a device for processing information according to an embodiment of the disclosure. The device for processing information is applied to a mobile device, and as illustrated in FIG. 10, includes a first acquisition module 301, a third sending module 302, a fifth receiving module 303 and a fourth sending module 304.

The first acquisition module 301 is configured to acquire, based on a login link displayed on a first vehicle-mounted terminal, a login page of a user account server.

The third sending module 302 is configured to send, based on the login page, a login request carrying a first account to the user account server providing a user account service.

The fifth receiving module 303 is configured to receive verification information issued by the user account server to the first account.

The fourth sending module 304 is configured to send, to an authorization proxy server requiring the user account service, an access request carrying the verification information. The verification information is used for the authorization proxy server to: apply, to the user account server, for a right for the first account to control the device to be controlled, and generate an associating record.

Optionally, the device further includes a sixth receiving module 305 and an output module 306.

The sixth receiving module 305 is configured to receive, from the authorization proxy server, authorization result information of the first account.

The output module 306 is configured to output the authorization result information.

Figure 11:
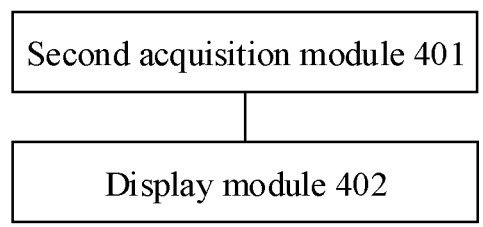
FIG. 11 illustrates a fourth diagram of a device for processing information, according to an example of the present disclosure.

FIG. 11 illustrates a fourth diagram of a device for processing information according to an embodiment of the disclosure. The device for processing information is applied to a first vehicle-mounted terminal, and as illustrated in FIG. 11, includes a second acquisition module 401, a display module 402 and a seventh receiving module 403.

The second acquisition module 401 is configured to: in response to not acquiring predetermined information of a device to be controlled, acquire a login link for logging into a user account server providing a user account service.

The display module 402 is configured to display the login link. The login link is used for the first vehicle-mounted terminal to obtain, based on a first account, a control right for controlling the device to be controlled.

The display module 402 is further configured to display, based on the control right obtained by the first account, predetermined information of the device to be controlled.

Optionally, the second acquisition module 401 is configured to send an acquisition request to a vehicle-mounted central control server serving for the first vehicle-mounted terminal. The acquisition request carries vehicle identification information of the first vehicle-mounted terminal and information of a vehicle owner identity.

The seventh receiving module 403 is configured to receive the login link fed back by the vehicle-mounted central control server. The login link is generated by the vehicle-mounted central control server, after obtaining, based on the vehicle identification information and the identity information of the vehicle owner, verification pass information from a vehicle manufacture account server.

Optionally, the device further includes a detection module 404.

The detection module 404 is configured to detect an operation instruction on the predetermined information. The operation instruction is used for the first vehicle-mounted terminal to trigger, based on the control right obtained by the first account, the device to be controlled, to execute the operation instruction.

Optionally, the control right obtained by the first account includes a control right of a second account, and the second account is an authorized account. The second account and the first account are associated with a same vehicle owner identity.

Optionally, the control right of the second account includes a preset control mode, for controlling the device to be controlled, stored in the second account.

The way in which modules of the devices in the embodiments above execute operations have been described in detail in the method embodiments, which will not be described.

Figure 12:
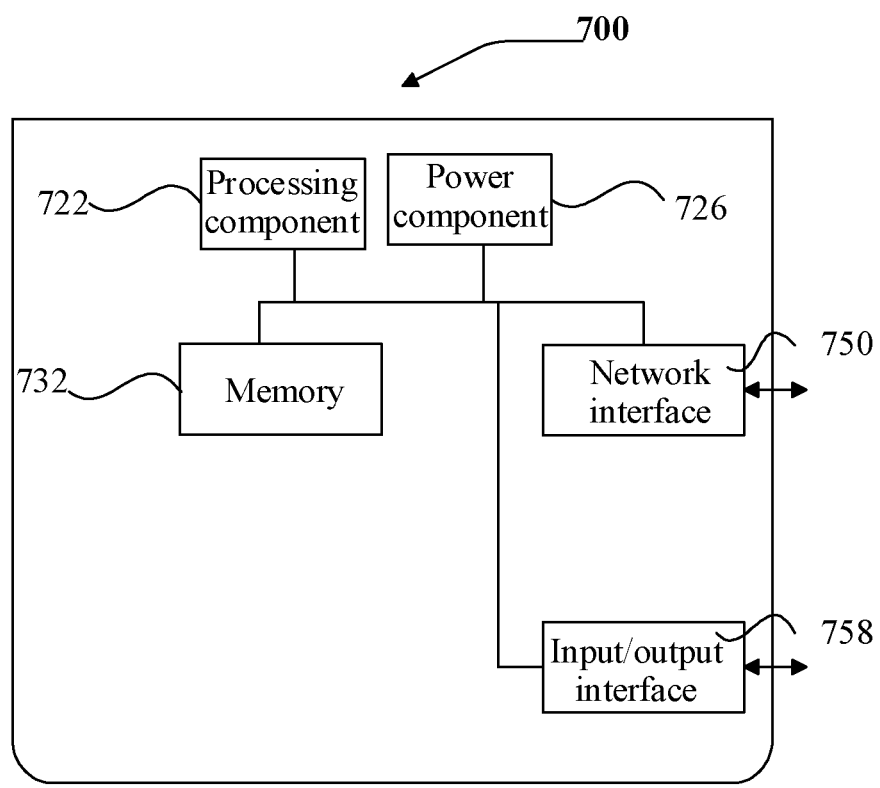
FIG. 12 illustrates a block diagram of a server, according to an example of the present disclosure.

FIG. 12 illustrates a block diagram of a server according to an embodiment of the disclosure. For example, a server 700 may be an authorization proxy server or a user account server.

As illustrates in FIG. 12, the server 700 includes a processing component 722 which further includes one or more processors; and a memory resource represented by a memory 732, for storing instructions executable by the processing component 722, for example an application. The application stored in the memory 732 may include one or more modules, each corresponding to a set of instructions. Additionally, the processing component 722 is configured to execute instructions, so as to perform the method for processing information.

The server 700 may further include: a power component 726 configured to perform power management for the server 700; a wired or wireless network interface 750 configured to connect the server 700 to a network; and an input/output (I/O) interface 758. The server 700 may operate based on an operating system stored in the memory 732, for example Windows Server™, Mac OS X™, Unix™, Linux™ or FreeBSD™.

In an embodiment, a non-transitory computer-readable storage medium including instructions is also provided, for example a memory 732 including instructions. The above instructions may be executed by the processing component 722 of the server 700 to complete the above method. For example, the non-transitory computer-readable storage medium may be a ROM, a random access memory (RAM), a CD-ROM, a magnetic tape, a floppy disk, an optical data storage device and so on.

Provided is a non-transitory computer-readable storage medium. Instructions in the storage medium, when executed by a processor of an authorization proxy server, enable the authorization proxy server to perform a method for processing information. The method includes: receiving a first account of a first vehicle-mounted terminal; determining, based on an associating record of a user account service, whether the first account is an authorized account that has been associated with the user account service; and in response to the first account being the authorized account that has been associated with the user account service, authorizing the first account with a control right for controlling a device to be controlled.

Provided is a non-transitory computer-readable storage medium. Instructions in the storage medium, when executed by a processor of a user account server, enable the user account server to perform a method for processing information.

The method includes the following operations. A login request is received from a mobile device. The login request carries a first account of a first vehicle-mounted terminal. In response to verification of the first account being passed, verification information is issued to the mobile device. An authorization request carrying the verification information is received from an authorization proxy server requiring the user account service. The authorization request is sent by the authorization proxy server after receiving, from the mobile device, an access request carrying the verification information. Verification is performed with the verification information. In response to success in the verification with the verification information, an authorization password is sent to the authorization proxy server. The authorization password is used for the authorization proxy server to generate an associating record of the first account having acquired a control right for controlling a device to be controlled.

Figure 13:
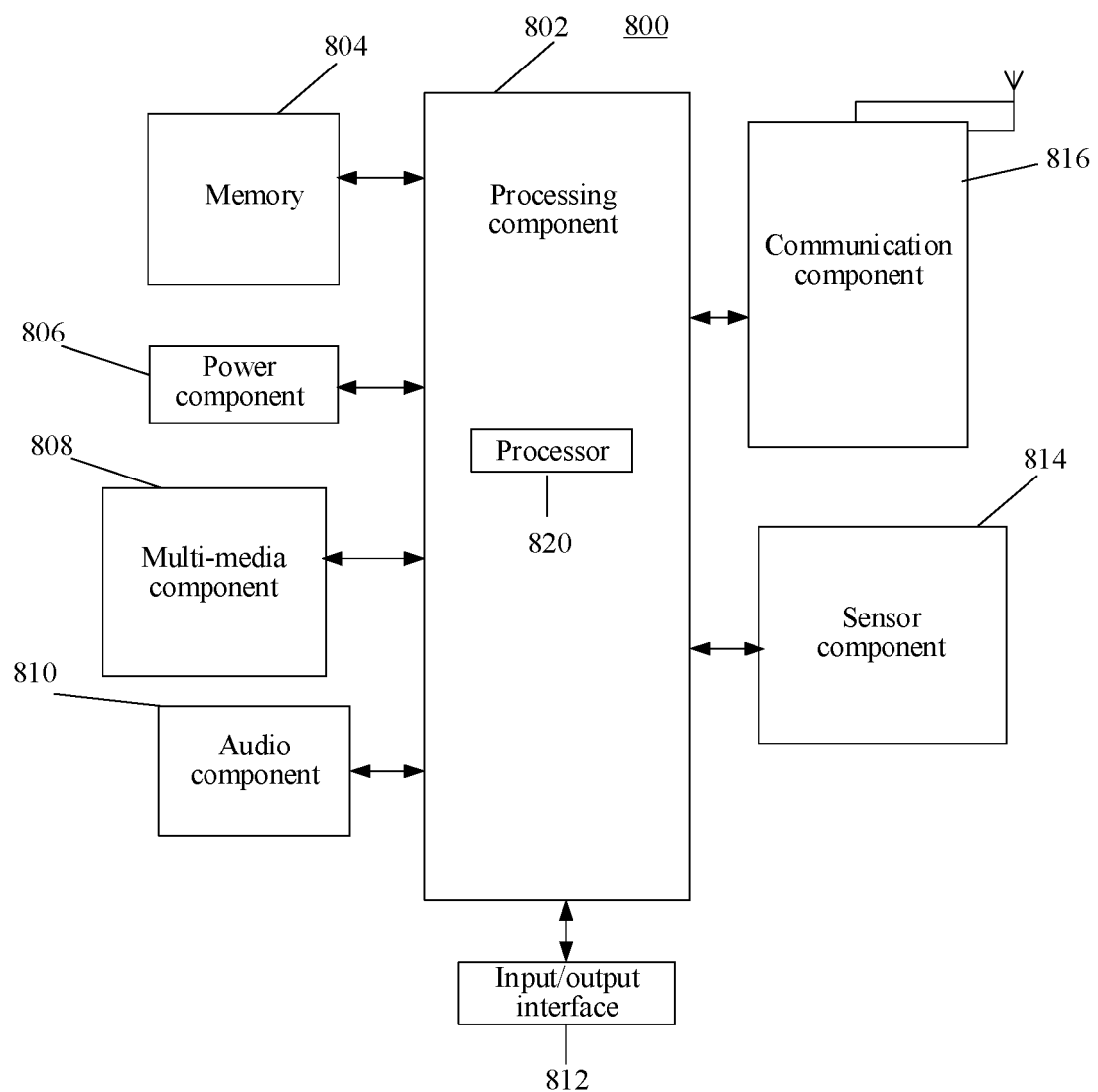
FIG. 13 illustrates a block diagram of a terminal device, according to an example of the present disclosure.

FIG. 13 illustrates a block diagram of a terminal device according to an embodiment of the disclosure. For example, the terminal device 800 may be a mobile device or a vehicle-mounted terminal.

As illustrated in FIG. 13, the terminal device 800 may include one or more of the following: a processing component 802, a memory 804, a power component 806, a multi-media component 808, an audio component 810, an input/output (I/O) interface 812, a sensor component 814, and a communication component 816.

The processing component 802 generally controls the overall operation of the terminal device 800, such as operations associated with display, a phone call, data communication, a camera operation and a recording operation. The processing component 802 may include one or more processors 820 to execute instructions, so as to complete all or some steps in the methods above. In addition, the processing component 802 may include one or more modules for the interaction between the processing component 802 and the other components. For example, the processing component 802 may include a multi-media module for interaction between the multi-media component 808 and the processing component 802.

The memory 804 is configured to store various types of data so as to support operations at the terminal device 800. The examples of these types of data include instructions of any application or method for operating on the terminal device 800, contact person data, phone book data, messages, pictures, video, etc. The memory 804 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 supplies power for the various components of the terminal device 800. The power component 806 may include a power management system, one or more power sources, and other components associated with the generation, management and distribution of power for the terminal device 800.

The multi-media component 808 includes a screen serving as an output interface between the terminal device 800 and a user. In some embodiments, the screen may include a liquid crystal display (LCD) and a touch pad (TP). If the screen includes a touch pad, then the screen may be implemented as a touch screen so as to receive an input signal from the user. The touch pad includes one or more touch sensors to sense touch, slide and gestures on the touch pad. The touch sensors may not only sense the boundary of a touch or slide action, but also can detect the duration and pressure related to the touch or slide operation. In some embodiments, the multi-media component 808 includes a front camera and/or a rear camera. When the terminal device 800 is in an operating mode, such as a photography mode or a video mode, the front camera and/or the rear camera may receive external multi-media data. Each front camera and rear camera may be a fixed optical lens system or have a focal length or optical zoom capability.

The audio component 810 is configured to output and/or input an audio signal. For example, the audio component 810 includes a microphone (MIC), and when the terminal device 800 is in an operating mode, such as a calling mode, a recording mode and a voice recognition mode, the microphone is configured to receive an external audio signal. The received audio signal can be further stored in the memory 804 or sent via the communication component 816. In some embodiments, the audio component 810 further includes a loudspeaker for output an audio signal.

The I/O interface 812 provides an interface between the processing component 802 and a peripheral interface module, and the above peripheral interface module may be a keyboard, a click wheel, a button, etc. The button may include but is not limited to a home page button, a volume button, a start button and a locking button.

The sensor component 814 includes one or more sensors for providing state evaluation for the device 800 from various aspects. For example, the sensor component 814 may detect an on/off state of the terminal device 800, and the relative positioning between components; for example, the components are a display and keyboard of the terminal device 800. The sensor component 814 may also detect a positional change of the device 800 or a component of the terminal device 800, whether there is contact between a user and the terminal device 800, the orientation or acceleration/deceleration of the terminal device 800, and a temperature change of the terminal device 800. The sensor component 814 may include a proximity sensor configured to detect the existence of an object nearby without any physical contact. The sensor component 814 may also include an optical sensor, such as a CMOS or CCD image sensor, for use in an imaging application. In some embodiments, the sensor component 814 may also include an acceleration sensor, a gyroscope sensor, a magnetic sensor, a pressure sensor or a temperature sensor.

The communication component 816 is configured for wired or wireless communication between the terminal device 800 and another device. The terminal device 800 may access a communication standard based wireless network, such as WiFi, 2G, 5G or a combination thereof. In an embodiment, the communication component 816 receives a broadcast signal from an external broadcast management system or broadcasts relevant information through a broadcast channel. In an embodiment, the communication component 816 further includes a near-field communication (NFC) module for short-range communication. For example, the NFC module may be implemented based on the radio-frequency identification (RFID) technique, the infrared data association (IrDA) technique, the ultra-wide band (UWB) technique, the Bluetooth (BT) technique or others.

In an embodiment, the device 800 may be implemented by one or more application-specific integrated circuit (ASIC), a digital signal processor (DSP), a digital signal processing device (DSPD), a programmable logic device (PLD), a field programmable gate array (FPGA), a controller, a micro-controller, a micro-processor or other electronic elements, for executing the above methods.

In an embodiment, a non-transitory computer-readable storage medium including instructions is also provided, for example a memory 804 including instructions. The above instructions may be executed by the processor 820 of the terminal device 800 to complete the above method. For example, the non-transitory computer-readable storage medium may be a ROM, a random-access memory (RAM), a CD-ROM, a magnetic tape, a floppy disk, an optical data storage device and so on.

Provided is a non-transitory computer-readable storage medium. Instructions in the storage medium, when executed by a processor of a mobile device, enable the mobile device to perform a method for processing information. The method includes: acquiring, based on a login link displayed on a first vehicle-mounted terminal, a login page of a user account server; sending, based on the login page, a login request carrying a first account to the user account server providing a user account service; receiving verification information issued by the user account server to the first account; and sending, to an authorization proxy server requiring the user account service, an access request carrying the verification information. The verification information is used for the authorization proxy server to: apply, to the user account server, for a right for the first account to control the device to be controlled, and generate an associating record.

Provided is a non-transitory computer-readable storage medium. Instructions in the storage medium, when executed by a processor of a first vehicle-mounted terminal, enable the first vehicle-mounted terminal to perform a method for processing information. The method includes the following operations. In response to not acquiring predetermined information of a device to be controlled, a login link for logging into a user account server providing a user account service is acquired. The login link is displayed. The login link is used for the first vehicle-mounted terminal to obtain, based on a first account, a control right for controlling the device to be controlled. The predetermined information of the device to be controlled is displayed based on the control right obtained by the first account.

Other embodiments of the disclosure would readily occur to those skilled in the art when considering the specification and practicing the disclosure here. The disclosure is aimed at covering any variants, usages or adaptive changes that comply with generic principles of the disclosure and include common knowledge or customary technical means in the art that is not disclosed in the disclosure. The specification and embodiments are merely considered an example, and the true scope and spirit of the disclosure are specified by the appended claims.

It should be understood that the disclosure is not limited to the precise structures described above and illustrated in the accompanying drawings, and modifications and changes may be made thereto without departing from the scope thereof. The scope of the disclosure is merely defined by the appended claims.

What is claimed is:

1. An authorization proxy server, comprising:
   one or more processors, and
   a non-transitory computer-readable storage medium storing instructions executable by the one or more processors, wherein the one or more processors are configured to:
   receive, from a mobile device having been authorized to access the authorization proxy server, an access request carrying a first account;
   determine that the access request carries verification information issued previously by a user account server, wherein one or more servers providing a user account service comprises the user account server;
   send, in response to determining that the access request carries the verification information, an authorization request carrying the verification information to the user account server;

receive an authorization password, wherein the authorization password is issued by the user account server after succeeding in verification with the verification information;

generate, in response to receiving the authorization password, an associating record for the first account carried in the access request;

receive first account information of a first vehicle-mounted terminal;

determine, based on the associating record of the user account service, that the first account corresponding to the first account information is an authorized account that has been associated with the user account service; and in response to the first account and an authorized second account of a second vehicle-mounted terminal being associated with a same vehicle owner identity, and the second account having been authorized with a control right for controlling a first device to be controlled, authorize the first account with the same control right for controlling the first device to be controlled;

wherein the one or more processors are further configured to:

send the authorization password to a vehicle manufacture account server corresponding to the first vehicle-mounted terminal, to enable the one or more processors of the authorization proxy server to, in response to authorizing the first account with the control right for controlling the device to be controlled, acquire, based on the first account, the authorization password from the vehicle manufacture account server, and provide the first account with the authorization password corresponding to the first account stored in the authorization proxy server.

2. The authorization proxy server according to claim 1, wherein the one or more processors are further configured to:

issue the authorization password to the first account, wherein the authorization password is used for the first account to control the device to be controlled.

3. The authorization proxy server according to claim 1, the one or more processors are further configured to:

generate an authorization code according to vehicle identification information, wherein the access request further carries vehicle identification information of the first vehicle-mounted terminal;

send, in response to determining that the access request carries the verification information, an authorization request carrying the verification information and the authorization code to the user account server; and receive the authorization password, wherein the authorization password is issued, based on the authorization code, by the user account server after succeeding in the verification with the verification information.

4. The authorization proxy server according to claim 1, wherein the verification information contains an access address of the authorization proxy server.

5. The authorization proxy server according to claim 1, wherein the one or more processors configured to authorize the first account with the same control right for controlling the first device to be controlled, are further configured to:

authorize the first account with a preset control mode, for controlling the first device to be controlled, stored in the second account.

6. A non-transitory computer-readable storage medium, wherein instructions in the storage medium, when executed by a processor of a computer, enable the computer to perform:

receiving, from a mobile device having been authorized to access the authorization proxy server, an access request carrying a first account;

determining that the access request carries verification information issued previously by a user account server, wherein one or more servers providing a user account service comprises the user account server;

sending, in response to determining that the access request carries the verification information, an authorization request carrying the verification information to the user account server;

receiving an authorization password, wherein the authorization password is issued by the user account server after succeeding in verification with the verification information;

generating, in response to receiving the authorization password, an associating record for the first account carried in the access request;

receiving first account information of a first vehicle-mounted terminal;

determining, based on the associating record of the user account service, that the first account corresponding to the first account information is an authorized account that has been associated with the user account service; and in response to the first account and an authorized second account of a second vehicle-mounted terminal being associated with a same vehicle owner identity, and the second account having been authorized with a control right for controlling a first device to be controlled, authorizing the first account with the same control right for controlling the first device to be controlled;

wherein the instructions in the storage medium, when executed by the processor of the computer, enable the computer to further perform;

sending the authorization password to a vehicle manufacture account server corresponding to the first vehicle-mounted terminal, to enable the one or more processors of the authorization proxy server to, in response to authorizing the first account with the control right for controlling the device to be controlled, acquire, based on the first account, the authorization password from the vehicle manufacture account server and provide the first account with the authorization password corresponding to the first account stored in the authorization proxy server.

7. The non-transitory computer-readable storage medium according to claim 6, wherein the instructions in the storage medium, when executed by the processor of the computer, enable the computer to further perform:

issuing the authorization password to the first account, wherein the authorization password is used for the first account to control the device to be controlled.

8. The non-transitory computer-readable storage medium according to claim 6, wherein the instructions in the storage medium, when executed by the processor of the computer, enable the computer to further perform:

generating an authorization code according to vehicle identification information, wherein the access request further carries vehicle identification information of the first vehicle-mounted terminal;

sending, in response to determining that the access request carries the verification information, an authorization request carrying the verification information and the authorization code to the user account server; and receiving the authorization password wherein the authorization password is issued, based on the authorization code, by the user account server after succeeding in the verification with the verification information.

9. The non-transitory computer-readable storage medium according to claim 6, wherein the verification information contains an access address of the authorization proxy server.

10. The non-transitory computer-readable storage medium according to claim 6, wherein the instructions in the storage medium, when executed by the processor of the computer, enable the computer to further perform:

authorizing the first account with a preset control mode, for controlling the first to be controlled, stored in the second account.

11. The authorization proxy server according to claim 1, wherein the one or more processors are further configured to:

authorize the first account with a control right for controlling a second device to be controlled.

12. The non-transitory computer-readable storage medium according to claim 6, wherein the instructions in the storage medium, when executed by the processor of the computer, enable the computer to further perform:

authorizing the first account with a control right for controlling a second device to be controlled.

* * * * *